United States Patent
Celniker (12)

(10) Patent No.: US 6,256,603 B1
(45) Date of Patent: Jul. 3, 2001

(54) PERFORMING GEOSCIENCE INTERPRETATION WITH SIMULATED DATA

(75) Inventor: George William Celniker, Austin, TX (US)

(73) Assignee: Schlumberger Technology Corporation, Austin, TX (US)

(*) Notice: Subject to any disclaimer, the term of this patent is extended or adjusted under 35 U.S.C. 154(b) by 0 days.

(21) Appl. No.: 09/019,465

(22) Filed: Feb. 5, 1998

Related U.S. Application Data

(62) Division of application No. 08/770,209, filed on Dec. 19, 1996, now Pat. No. 5,905,657.

(51) Int. Cl.[7] ........................................... G06G 7/48

(52) U.S. Cl. ........................... 703/10; 703/5; 702/6

(58) Field of Search ..................... 395/500.31, 500.27, 395/500.26; 702/9, 10, 6; 378/205; 382/168; 345/474; 405/42; 73/40; 703/5, 1, 6, 10

(56) References Cited

U.S. PATENT DOCUMENTS

| | | | |
|---|---|---|---|
| 4,314,338 | 2/1982 | Suau et al. | 364/422 |
| 4,858,149 | 8/1989 | Quarendon | 395/125 |
| 4,890,242 | 12/1989 | Sinha et al. | 395/119 |
| 4,912,664 | 3/1990 | Weiss et al. | 364/577 |
| 4,928,233 | 5/1990 | Millis | 364/522 |
| 4,944,034 | 7/1990 | Ohsawa | 364/522 |
| 4,991,095 | 2/1991 | Swanson | 364/421 |
| 5,003,498 | 3/1991 | Ota et al. | 364/522 |
| 5,010,502 | 4/1991 | Diebel et al. | 364/522 |
| 5,012,431 | 4/1991 | Stanziola | 364/526 |

(List continued on next page.)

FOREIGN PATENT DOCUMENTS

| | | | |
|---|---|---|---|
| 0 447 629 A2 | 9/1991 | (EP) . | |
| 0 745 087 A2 | 12/1996 | (EP) | G01V/1/28 |
| WO 95/30209 | 11/1995 | (WO) . | |
| WO 97/38330 | 10/1997 | (WO) | G01V/1/34 |
| WO 98/27498 | 6/1998 | (WO) . | |

OTHER PUBLICATIONS

Kim et al, "Representation Of a Curved Boundary", IEEE Proceedings of the Twenty–Third Southeastern symposium on System Theory, pp. 84–88 Mar. 1991.*

Ames, Arlo, "Production ready feature recognition based automatic group technology part coding", proceedings of Symposium on Solid Modeling Foundations and CAD/CAM Applications, Rossignac/Turner editors, Austin, TX, Jun. 5–7, 1991, p. 161.

Baumgart, B., "Winged–edge Polyhedron Representation", Stanford Artificial Intelligence Report, No. CS–320, Oct. 1972.

(List continued on next page.)

*Primary Examiner*—Kevin J. Teska
*Assistant Examiner*—Samuel Broda
(74) *Attorney, Agent, or Firm*—Howard L. Speight; Pehr B. Jansson

(57) ABSTRACT

A method, computer system, and computer program for analyzing geological data sampled from a subsurface region and an analysis of the geological data stored in a geoscience model on a magnetic media, including building a simulation input model from the geoscience model. Data is acquired and interpreted to produce a geoscience model. A boundary is constructed for dividing the region into a first sub-region and a second sub-region; storing on the magnetic media the shape of the boundary as a parametric function whose parameter density can vary. A subsurface region divided into sub-regions, in each of which a material property varies without discontinuities.

6 Claims, 5 Drawing Sheets

U.S. PATENT DOCUMENTS

Figure 1:
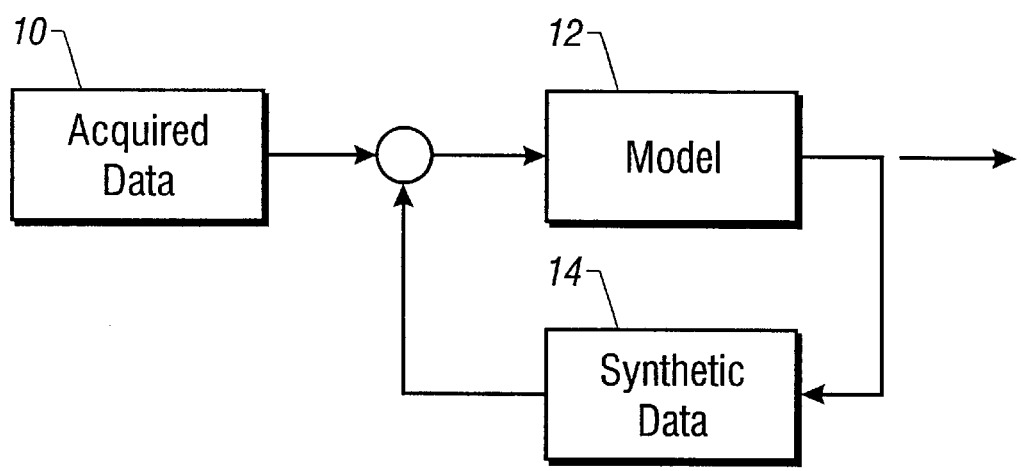

| | | | |
|---|---|---|---|
| 5,229,976 | | 7/1993 | Boyd et al. ............................ 367/73 |
| 5,309,360 | | 5/1994 | Monk et al. ........................ 364/420 |
| 5,359,526 | | 10/1994 | Whittington et al. . |
| 5,388,044 | * | 2/1995 | Hepp ..................................... 702/10 |
| 5,497,452 | | 3/1996 | Shimizu et al. . |
| 5,548,563 | * | 8/1996 | Slevinsky .............................. 367/25 |
| 5,583,825 | | 12/1996 | Carrazzone et al. ................... 367/31 |
| 5,648,937 | | 7/1997 | Campbell .............................. 367/27 |
| 5,767,680 | * | 6/1998 | Torres-Verdin et al. ............. 324/355 |
| 5,813,798 | * | 9/1998 | Whiffen ................................ 405/42 |
| 5,842,149 | * | 11/1998 | Harrell et al. ........................... 702/9 |

OTHER PUBLICATIONS

Braid, I.C. et al., "Stepwise Construction of Polyhedra in Geometric Modeling", Mathematical Methods in Computer Graphics and Design, K.S. Brodlie editor, Academic Press, 1980.

Brown, A.R., "Interpretation of Three–Dimensional Seismic Data", 3rd Ed., American Association of Petroleum Geologists, Tulsa OK, 1986.

Celniker, G. et al., "Deformable Curve and Surface Finite Elements for Free–Form Shape Design", Computer Graphics, vol. 25, No. 4, 1991.

Celniker, G. et al., "Visualization and Modeling of Geophysical Data", Proceedings Visualization '93, San Jose, CA, Oct. 25–29, 1993.

da Silva, R.E. et al., "An Algebraic Approach to Geometric Query Processing in CAD/CAM Applications", proceedings of Symposium on Solid Modeling Foundations and CAD/CAM Applications, Rossignac & Turner editors, Austin, TX, Feb. 22, 1991.

De Martino, T. et al., "Feature–based Modelling by Integrating Design and Recognition Approaches", Computer–Aided Design, vol. 26, No. 8, Aug. 1994.

Duan, W. et al., "FSMT: A Feature Solid–Modelling Tool for Feature–Based Design and Manufacture", Computer–Aided Design, vol. 25, No. 1, Jan. 1993.

Farin, G., "Curves and Surfaces for Computer Aided Geometric Design", Academic Press, 2d ed., New York, 1990.

3D VSP–3D Vertical Seismic Profile Modeling, http://www.gxt.com/productinfo/3dvspinfo.html, GX Technology Corporation, Houston, TX.

Glassner, A.S., Useful 3D Geometry, Graphics Gems, Academic Press, ISBN 0–12–286165–5.

Heymans, M. et al., "Testing Hydrocarbon Saturation Models for Use in Original Oil–In–Place Estimation:", South Dome of Oregon Basin Field, Park County, Wyoming, Computer Modeling of Geologic Surfaces and Volumes, AAPG Computer Applications in Geology, No. 1, The American Association of Petroleum Geologists.

Hughes, T.J.R., The Finite Element Method—Linear, Static and Dynamic Finite Element Analysis, Prentice Hall, Englewood Cliffs, N.J., 1987.

Laakko, T. et al., "Feature Modelling by Incremental Feature Recognition", Computer–Aided Design, vol. 25, No. 8, Aug. 1993.

Lorenson, W.E., et al., "Marching Cubes: A High Resolution 3D Surface Construction Algorithm", Computer Graphics, vol. 21, No. 4, Jul. 1987.

Lou, Y. et al., "A Boundary Representation for Form Features and Non–Manifold Solid Objects", Proceedings of Symposium on Solid Modeling Foundations and CAD/CAM Applications, Rossignac & Turner editors, Austin TX, Jun. 5–7, 1991.

Lovell, J., Finite Element Methods in Resistivity Logging, Ph.D. dissertation, Technical University Delft, 1993.

Millman, R.S. et al., Elements of Differential Geometry, Prentice Hall, Englewood Cliffs, N.J., 1977.

Munkres, J.R., Elements of Algebraic Topology, Benjamin/Cummings Publishing Co., Inc., Menlo Park, CA, 1984.

Pratt, M.J., "Synthesis of an Optimal Approach to Form Feature Modelling", in Proceedings of the ASME International Computers in Engineering Conference and Exhibition, San Francisco, CA, Jul. 31–Aug. 4, 1988.

Shah, J.J. et al., "Feature–Based Modeling Shell. Design and Implementation", Computers in Engineering, pp. 255–261, Dept. of Mech. and Aerospace Eng., Arizona St. University, Tempe, AZ, 1988.

Simmons, R.G., "Representing and Reasoning About Change in Geologic Interpretation", Technical Report 749, MIT Artificial Intelligence Laboratory, Dec. 1983.

Weiler, K.J., Topological Structures for Geometric Modeling, Ph.D. thesis, Rensselaer Polytechnic Institute, Troy, New York, Aug. 1986.

Wyatt, K.D., et al., "Building Velocity–Depth Models for 3D Depth Migration", The Leading Edge, vol. 13, No. 8, Aug. 1994, pp. 82–866.

Teller, S. et al., "Partitioning and Ordering Large Radiosity Computations", Computer Graphics Proceedings, Annual Conference Series, 1994.

Product Availability by Platform, http://www.gxt.com/productinfo/platformlist.html#3daims, GX Technology Corporation, Houston, TX.

Product Availability by Platform, http://www.gxt.com/productinfo/platformlist.html, GX Technology Corporation, Houston, TX.

Product Information, http://www.gxt.com/productinfo/productinfo.html, GX Technology Corporation, Houston, TX.

* cited by examiner

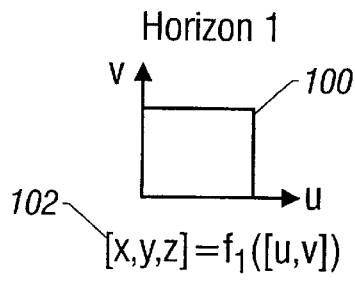
Figure 6A
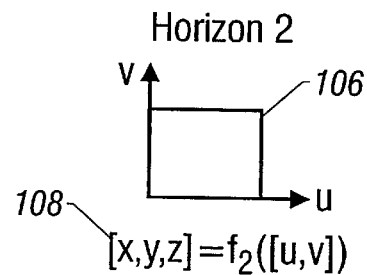
Figure 6C
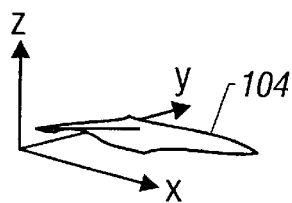
Figure 6B
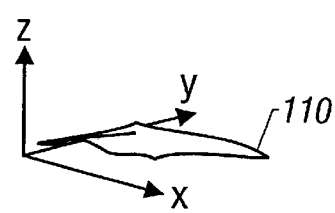
Figure 6D
Figure 6E
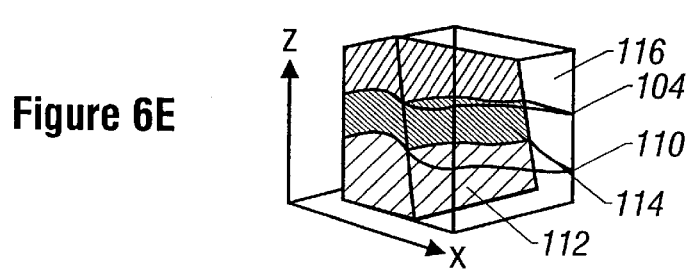
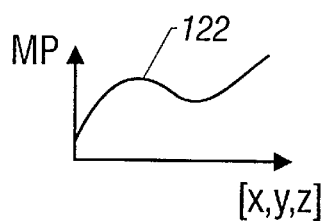
Figure 6F
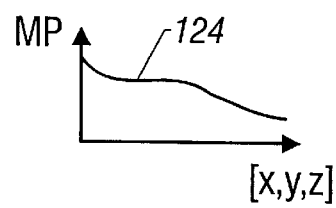
Figure 6G

PERFORMING GEOSCIENCE INTERPRETATION WITH SIMULATED DATA

This is a divisional of U.S. application Ser. No. 08/770,209, filed Dec. 19, 1996, now U.S. Pat. No. 5,905,657.

BACKGROUND

This invention relates to performing geoscience interpretation with simulated data.

Geologists, geophysicists, petroleum engineers and production engineers use models, including computerized models, of the earth's shell to plan exploration and production of hydrocarbons and, to a lesser extent, other minerals. As hydrocarbons become more and more scarce, the accuracy of the computerized models becomes increasingly important to limiting the cost of locating and producing hydrocarbons and the associated cost of hydrocarbon products, such as gasoline and heating oil.

Existing modeling systems use an "inversion" technique to model geoscience structures from acquired data. Acquired data, such as velocity measurements or data collected through seismic instrumentation, is "inverted" and used to predict the location of subsurface structures and the physical properties of those subsurface structures.

Once the inversion process produces predictions of the locations and physical properties of the subsurface structures, they are modeled geometrically. Such models must be capable of representing complicated geometrical shapes, such as the shape of a salt dome or salt wall or the shape of a group of folded sedimentary beds.

Commonly, modeling systems use a grid system to represent subsurface structures. In a grid system, the subsurface structures are represented by points in space regularly spaced in the x-y plane and having a single value in the z plane. The values corresponding to those subsurface structures between the regularly-spaced points are determined by interpolation. In a model for a large subsurface region, the number of points in space can be numerous, requiring a great deal of storage, even if the subsurface structures are uniform in topography and physical properties across that space.

Another modeling system that has been applied to the problem of modeling subsurface structures is constructional solid geometry ("CSG"). Under this approach, two or more solid primitives (such as cylinders or spheres) are combined to form a more complicated solid. The process begins with objects that are known to be solid and adds or subtracts other solids to create new shapes. For example, subtracting a cylinder from a box will produce a box with a hole in it.

SUMMARY

In general, in one aspect, the invention features a method for analyzing geological data stored in a geoscience model on a magnetic media, comprising building a simulation input model from the geoscience model.

Implementations of the invention may include one or more of the following. The method may further comprise acquiring data; interpreting the acquired data to produce the geoscience model; applying a simulator to the simulation input model to produce synthetic data; comparing the acquired data to the synthetic data to produce a difference; and editing the geoscience model to reduce the difference. The simulator may comprise a simulation program used to develop acquisition equipment. Building the simulation model may comprise producing a finite element mesh. Building the simulation model may comprise producing a finite difference grid. Building the simulation input model may comprise producing a tessellated model. The simulation input model may have a different format than the geoscience model.

In general, in another aspect, the invention features a method for analyzing geological data representing a subsurface region, the geological data being stored in a geoscience model on a magnetic media, comprising constructing a boundary for dividing the region into a first sub-region and a second sub-region; storing on the magnetic media the shape of the boundary as a parametric function whose parameter density can vary.

In general, in another aspect, the invention features a method for analyzing geological data sampled from a subsurface region, the geological data and an analysis of the geological data being stored in a geoscience model on a magnetic media, the method comprising dividing the region into sub-regions, in each of which a material property varies without discontinuities.

Implementation of the invention may include one or more of the following. The method may further comprise describing the variation of the material property with a parametric function.

In general, in another aspect, the invention features a computer system for analyzing geological data stored in a geoscience model on a computer-readable magnetic media, comprising means for building a simulation input model from the geoscience model.

Implementations of the invention may include one or more of the following. The computer system may further comprise means for acquiring data; means for interpreting the acquired data to produce the geoscience model; means for applying a simulator to the simulation input model to produce synthetic data; means for comparing the acquired data to the synthetic data to produce a difference; and means for editing the geoscience model to reduce the difference. The simulator may comprise a simulation program used to develop acquisition equipment. The means for building the simulation input model may comprise a means for producing a finite element mesh. The means for building the simulation data input model may comprise a means for producing a finite difference grid. The means for building the simulation input model may comprise a means for producing a tessellated model. The simulation input model may have a different format than the geoscience model.

In general, in another aspect, the invention features a computer system for analyzing geological data sampled from a subsurface region, the geological data and an analysis of the geological data being stored in a geoscience model on a computer-readable magnetic media, comprising means for constructing a boundary for dividing the region into a first sub-region and a second sub-region; means for storing on the magnetic media the shape of the boundary as a parametric function whose parameter density can vary.

In general, in another aspect, the invention features a computer system for analyzing geological data sampled from a subsurface region, the geological data and an analysis of the geological data being stored in a geoscience model on a magnetic media, the computer system comprising means for dividing the region into sub-regions, in each of which a material property varies without discontinuities.

In general, in another aspect, the invention features a computer program, residing on a computer-readable medium, for analyzing geological data sampled from a subsurface region and an analysis of the geological data stored in a geoscience model on a magnetic media, comprising instructions for causing a computer to build a simulation input model from the geoscience model.

Implementations of the invention may include one or more of the following. The computer program may further comprise instructions for causing the computer to acquire data; interpret the acquired data to produce the geoscience model; apply a simulator to the simulation input model to produce synthetic data; compare the acquired data to the synthetic data to produce a difference; and edit the geoscience model to reduce the difference. The simulator may comprise a simulation program used to develop acquisition equipment. The instructions which cause the computer to build the simulation input model may comprise instructions which cause the computer to produce a finite element mesh. The instructions which cause the computer to build the simulation input model may comprise instructions which cause the computer to produce a finite difference grid. The instructions which cause the computer to build the simulation input model may comprise instructions which cause the computer to produce a tessellated model. The simulation input model may have a different format than the geoscience model.

In general, in another aspect, the invention features a computer program, residing on a computer-readable medium, for analyzing geological data sampled from a subsurface region, the geological data and an analysis of the geological data being stored in a geoscience model on a magnetic media, comprising instructions for causing a computer to construct a boundary for dividing the region into a first sub-region and a second sub-region; store on the magnetic media the shape of the boundary as a parametric function whose parameter density can vary.

In general, in another aspect, the invention features a computer program, stored on a computer-readable medium, for analyzing geological data sampled from a subsurface region, the geological data and an analysis of the geological data being stored in a geoscience model on a magnetic media, the computer program comprising instructions for causing a computer to divide the region into sub-regions, in each of which a material property varies without discontinuities.

DESCRIPTION

Figure 2:
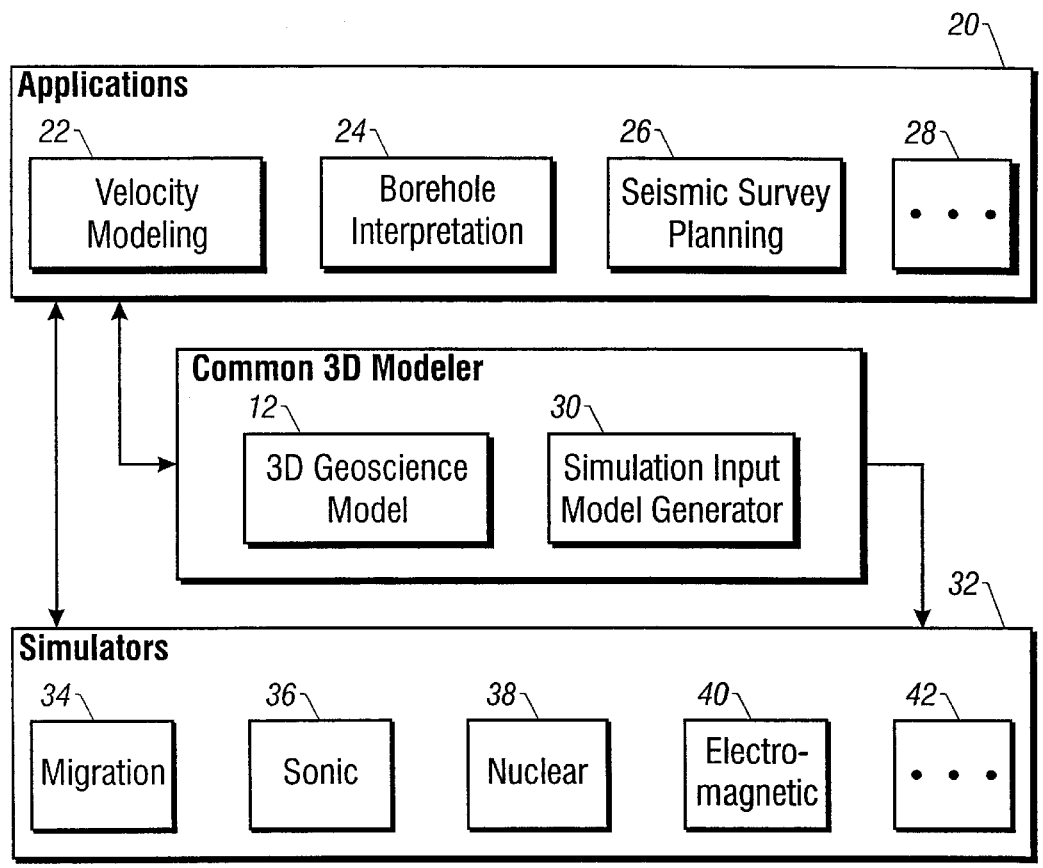
Figure 3:
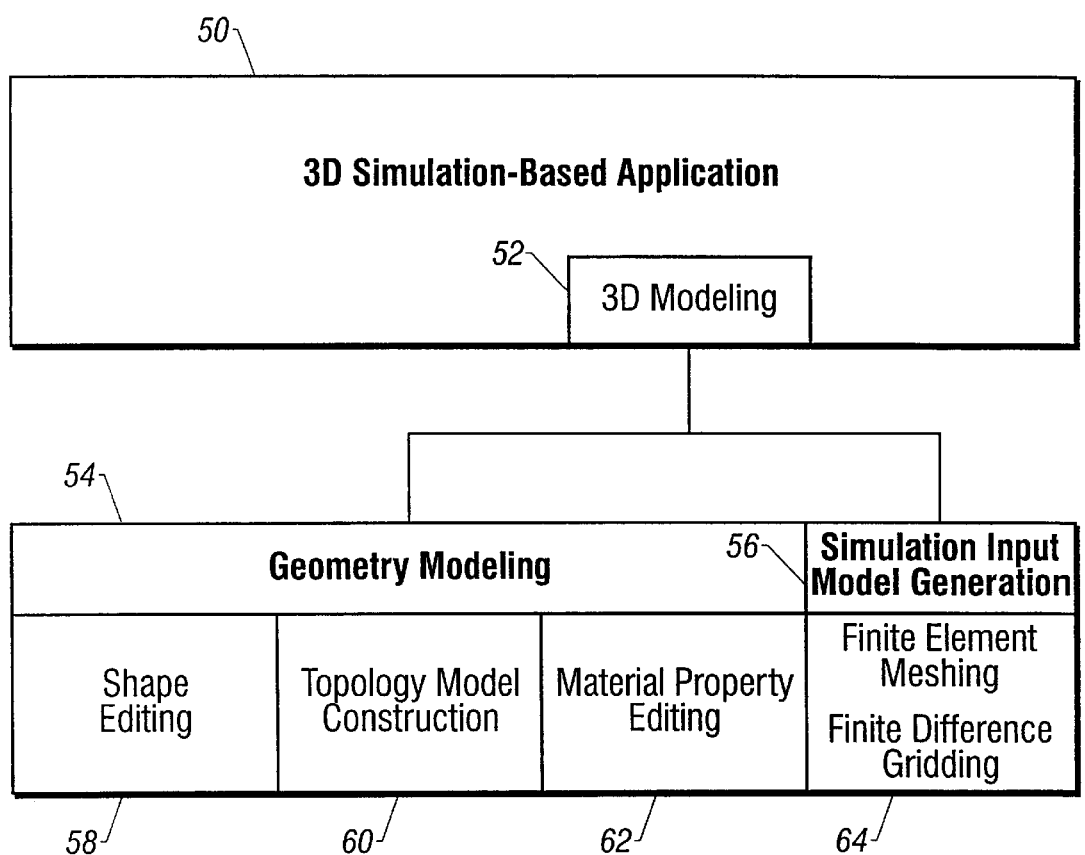

FIGS. 1–3 are block diagrams.

FIGS. 4a–c, 5a–c and 6a–g are representations of modeled items.

Simulation based interpretation ("SBI"), illustrated in FIG. 1, is an alternative to the inversion process for producing consistent models from acquired data. SBI begins by gathering acquired data 10 from the geologic structures being modeled. The acquired data is interpreted and the resulting interpretation is captured as a geoscience model 12. The model is then tested by simulating an original acquisition experiment to produce synthetic data 14. For example, the simulation programs used to develop acquisition equipment can be used to produce the synthetic data. Differences between the synthetic data 14 and the acquired data 10 are determined and used to adjust the model. Repeated iterations of these steps may cause the model to converge toward a consistent model in which the differences between the synthetic and the acquired data are reduced. Making a single interpretation consistent with several measurements from a variety of experiments at one time continues to improve the quality of the interpretation. Trained interpreters can use such a system interactively to build interpretations which can be relied upon for prediction purposes.

The geoscience model 12 is a permanent repository of the interpretation which is stored in a general format so that input for a variety of simulators can be generated from it. The geoscience model is editable so that interpreters can quickly converge the model to a consistent interpretation. Once the geoscience model exists and has been verified as consistent with existing data, it can be used for a variety of predictive and planning purposes such as survey planning, estimating reservoir performance, and well completion planning.

The same technologies needed to support simulation based interpretation can be used to improve the process for designing acquisition equipment. Equipment models placed within geoscience models may be used to build simulation input models for simulators. Simulation outputs are analyzed and compared to design specifications. Design alternatives and parameter variations can be quickly tested and optimized prior to building the first prototype.

The same technologies needed to support simulation based interpretation can be used to improve the quality of acquired data by improving the process of survey planning. Source and receiving equipment models placed in geoscience models may be used to generate simulation input models for simulators. Simulation outputs may be analyzed and used to optimize the placement of the sources and receivers.

One part of the geoscience model is a geometric representation of a portion of the earth's subsurface. In geoscience applications, known geometric primitives, such as spheres and cylinders, are less useful than in other applications. While the underground structures may have started out their geological life capable of being described as simple geometric primitives, over time most have become distorted and are not easily represented using a grid system or a constructional solid geometry system. For example, if a set of sedimentary beds folds over on top of itself, a single x-y point will have two or more z values for a given bed. Further, the shapes are very complicated and not easily represented using CSG primitives.

The role of the geoscience model is to represent the shape and properties of a system under study so that simulation programs may be used to enhance understanding of the system, as shown in FIG. 2. A variety of 3D modeling applications 20 including velocity modeling 22, borehole interpretation 24, seismic planning 26, and others 28, share a common geoscience model 12. A simulation input model generator 30 generates from the geoscience model inputs required for a variety of simulators 32, such as migration 34, sonic 36, nuclear 38, electromagnetic 40 and other types of simulators 42.

A simulation input model uses the data format required by a simulation program. Each simulation program has its own specialized input data format. These formats are specified for a variety of reasons including, but not limited to, run time efficiency, data storage efficiency, numerical methodology, and design history.

The current generation of simulation programs are based primarily upon the finite element, the finite difference, and ray tracing methods. The simulation input model generator provides automated procedures for generating finite difference grids, finite element meshes and tessellated models for ray tracing that may be specialized to a particular simulation program's requirements.

The domain of the geoscience model is defined by the simulation programs it is required to support. Despite the many different physical phenomena that the simulators model, they all have the following in common:

(a) the continuum assumption;
(b) a representation of distributed material properties;
(c) a set of shared simulation techniques including the finite element, finite difference, and ray tracing methods.

The continuum assumption states that at a sufficiently large scale material properties, such as porosity and velocity, of a sub-region, which is a portion of a region, can be approximated by macroscopic properties that vary smoothly throughout the sub-region. The locations of discontinuities in the material properties, such as at a fault, are called "boundaries." Material property fields and their discontinuities can be represented in a geoscience model which contains the following information:

(a) Shape, which is defined to be the location of the discontinuity boundaries;
(b) Topology, which is defined to be the connections between boundaries and sub-regions;
(c) Material properties, which are defined to be smoothly varying values within and on the boundaries of each sub-region and boundary object; and
(d) Simulation input models, which are defined to be an extraction of the information in a geoscience model in a form suitable for use by a simulation package.

The geoscience model and the simulation input models are distinguished so that any number of simulation packages can be supported by a single geoscience model. The simulation input models support simulation based interpretation applications.

Irregular space partition ("ISP") models are a representation of smoothly varying material property fields which may contain internal discontinuities that occur along distinct boundaries. A discontinuity in a material property occurs where the material property value differs by a finite amount on either side of a discontinuity boundary. The location of the discontinuity boundaries make up the shape of the model. ISP models explicitly represent the shape of the discontinuity boundaries. These boundaries may lie anywhere in an infinite space, have any shape, and intersect one another to partition space into sets of distinct sub-regions. Within any one sub-region, the material property can be represented by a smoothly varying function.

The boundaries can be highly irregular in shape and can comprise portions where their shape is fairly uniform (such as a plane or a surface that approximates a plane) and other portions where the boundary is changing rapidly (such as where folding occurs). The uniform portions of the boundaries can be represented accurately with fewer parameters. For example, a plane can be represented by three points. In the portions where the boundary is changing rapidly, however, it is necessary to use more parameters to achieve an accurate representation.

For example, a "hybrid" surface may be made from both a grid and a mesh. The grid represents the bulk of the surface (typically the interior) where a high density of points is not necessary. The mesh represents the surface boundary areas and surface intersections with other surfaces, curves or points where high density is required. Thus, the surface is represented with a high density of parameters only where such a representation is necessary. This allows the system to store large surfaces efficiently while maintaining higher accuracy of surface boundaries, when compared to regular grid representations.

ISP models are also used to model manufactured objects such as acquisition, drilling, and truck equipment, which are represented as solid models. Points in a solid model are classified as being either in or out of the modeled object. In such cases, boundaries are not discontinuities between two regions but the demarcation of the end of the model. In a sense, there is nothing on the other side of a boundary. Solid models do not contain internal boundaries.

A three-dimensional simulation-based application 50 includes three-dimensional modeling 52 which comprises four basic geoscience model building steps divided into geometry modeling 54 and simulation input model generation 56, as shown in FIG. 3. The sequence of shape editing 58, topology model building 60, material property editing 62, and simulation input model generation 56 (which comprises finite element meshing/finite difference gridding/tessellation for ray tracing) defines the scope of geoscience modeling.

As discussed above, a geoscience model may consist of a combination of a large number of simple geometry primitives. Each geometry primitive is initialized, shaped, and positioned interactively by a user in relationship to the rest of the geoscience model. These geometry primitives include such shapes as lines, circles, planes, free-form surfaces, and solid sub-volumes.

The shape of a geometry primitive is defined to be the set of points it occupies in space. For example, a circle of radius R, lying in a plane parallel to the x-y plane and centered on the point [a, b, c] is the set of points given by the function $$x = a + R \cos(\theta)$$

$$y = b + R \sin(\theta)$$

$$z = c$$

where theta is in the range $0 <= \theta < 2\pi$.

These equations define a map from theta space to [x, y, z] space; that is, for every value of theta there is a unique value of [x, y, z]. Since theta can be any of an infinite number of points the number of points in the circle is also infinite.

The values {a, b, c, R} are called the parameters of the circle. Together, they completely specify all the points that define the circle. The functions which represent geometry primitive shapes are all parametric, single valued, continuous functions. These functions have well behaved mathematical properties upon which the algorithms used to build, edit, and query complicated geoscience models depend. Parameterization allows an infinite number of points to be specified by a discrete number of values. Interfaces can be built that conveniently allow the users to edit the parameter values. For example, a pick and drag window-based interface allows a user to select the circle's center point and drag it through space. The code that implements this behavior has only to convert the mouse's position into a spatial (x, y, z) location and use those values to change the shape of the circle, e.g. a=x, b=y, c=z.

Shape editing is the interactive process of modifying a shape's parameters until it is in a form suitable for use with the rest of the geoscience model. In the circle example, the object has only 4 parameters. In general, an object may have many more parameters. For example, a free-form surface represented as a triangulated mesh can have thousands of parameters. The application which helps a user edit the shape of an object with a large number of parameters may very well be a complicated application in itself. But all shape editing applications are dedicated to creating new geometry primitives and setting their parameter values.

There are two kinds of shape editing applications: those that extract shapes from data, and those that build shapes from scratch. Extracting shape from data is a user directed semi-automated process, while building shape definitions from scratch is interactive.

ISP and solid models are built by combining sets of geometry primitives and recording where the primitives intersect one another. In three-dimensional ISP building, a user creates a number of surface boundary shapes and uses them to sub-divide space locally to define a set of sub-volumes in a single model. Where boundaries intersect one another, new intersection geometry objects are created to represent the intersection shape and to record the connection among the boundaries. When sets of boundaries interact to separate one region of space from another, a sub-region object is created for each distinct sub-region. Groups of sub-regions may be used to represent application features such as formations and invasion zones, and boundaries may be used to represent application features like horizons, faults, and borehole boundaries. Not every object in a geoscience model is used to represent an application feature, but every application feature with a geometric description is associated with a geometry object. Geometry objects representing the shape of an application feature are called geometry features.

Building solid models is very similar to building ISP models. In solid modeling, the user builds a sequence of solid shapes and combines them together with the standard boolean operators of union, subtract, and intersect to create accurate representations of complicated machined metal solids. The side effect of editing the topology structure representation when combining primitives into ISP and solid models is automated. Sequences for building ISP and solid models may use the subdivide, insert, and subtract operators, which are just a few of the topology editing operators to be found in a general geometry modeling application and which are described in detail in co-pending application Ser. No. 08/772,082, U.S. Pat. No. 6,128,577 entitled "Modeling Geological Structures and Properties," incorporated by reference.

Figure 4A:
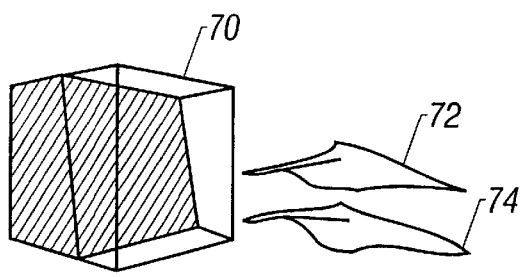
Figure 4B:
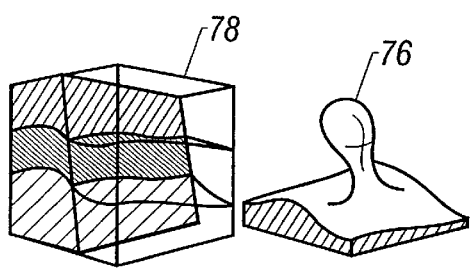
Figure 4C:
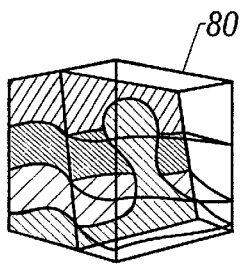

An example of ISP modeling is shown in FIGS. 4a–c. A volume 70 may be subdivided by two surfaces 72 and 74, as shown in FIG. 4a. Another volume 76, representing, for example, a salt dome, may be inserted into the subdivided volume 78 as shown in FIG. 4b. The result is a subdivided volume 80 containing a variety of complicated shapes, as shown in FIG. 4c. An analyst can mark interesting geometry objects such as the horizons, formed by surfaces 72 and 74, or the salt body 76.

Figure 5A:
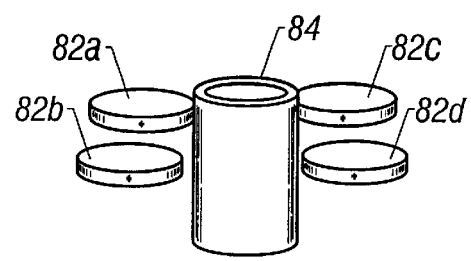
Figure 5B:
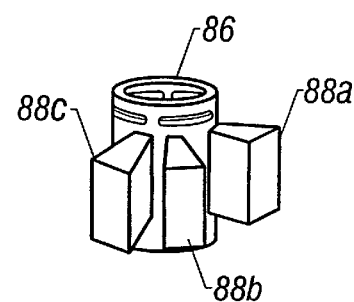
Figure 5C:
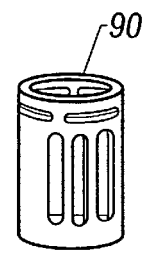

An example of solid model building is illustrated FIGS. 5a through 5c. A series of sub-volumes 82a–d is subtracted from an initial shape 84, as shown in FIG. 5a to produce the volume 86, illustrated in FIG. 5b. Additional sub-volumes 88a–c are subtracted from the volume, as shown in FIG. 5B, resulting in a sub-volume 90, shown in FIG. 5C.

Material property editing is the process of annotating a geoscience model with material properties. Material property fields, like shape, are represented by functions. A parametric function is used to map each point in a modeling image space to a material property value. Any continuous function may be used. Some of the more common functions include: constants, constant gradients, and free-form functions (such as triangulated surfaces, poly-lines, NURBS, bi-cubic patches, etc.).

The shape and topology information in a geoscience model is used to model material property discontinuities. Each material property discontinuity is marked by a geometry boundary creating sets of sub-regions in which the material property field is smoothly varying. Each sub-region is associated with its own function for representing a common material property field. Thus, material property discontinuities are represented by using different material functions on either side of a discontinuity boundary. It takes two steps to evaluate the material property at a point within a geoscience model:

(a) find the sub-region containing the point and its associated material property function; and (b) evaluate the sub-region's material property function at the required point. Any number of material property fields can be represented in a geoscience model by storing one parametric function for each material property in each sub-region.

Material property fields may also be defined on region boundaries. These are known as "boundary material properties" as opposed to "region material properties." Boundary material properties can be associated with the entire boundary or with just one side of the boundary. Oriented boundary material properties may be used to describe boundary value problems.

The value of a material property at a point is a tensor. The tensor may be represented by either a scalar, vector, or matrix quantity. It is a description of properties with intrinsic geometric properties, e.g., it remains invariant under coordinate transformations. The components of a tensor are represented in a chosen coordinate system. Changing the coordinate system changes the values of the coordinates. Relationships between tensor quantities as defined by fundamental physical laws are independent of coordinate transformations. For example, Newton's law defines the relationship between acceleration, A, and force, F, as, F=mA, which defines the quantity mass, m. This relationship is true independent of which coordinate system is chosen to describe the components of the tensor quantities F, m, and A. In this system, there is no special accommodation for tensors. The components of a high order tensor are stored as a set of scalar values and the applications manage the constraints between component values.

Material property editing, like shape editing, occurs in two ways: building material property fields from data and from scratch. Material property editing consists of:

(a) Specifying the set of material properties to be represented in the geoscience model.

(b) Selecting and assigning a parametric function for each material property
in each sub-region, and optionally
in each boundary, and
on each side of a boundary.

(c) Editing the parameters of the material property parametric functions as desired.

Representing a material property field in an ISP geoscience model is done by using functions. Functions are used to represent the boundary shapes which mark the discontinuities within the material property field and map points from a parameter space to a shared image space. Each boundary has its own parameter space but all boundaries share a common image space. The parameter space is the domain of the shape function and the shared image space is its range. The shared image space is used as the domain for a function which represents a material property field. Every point in the shared image space is projected into a material property value by the material property function.

The steps used to subdivide a volume and assign material properties to the volume are illustrated in FIGS. 6a–g. A first horizon 100 is represented in parameter space, as shown in FIG. 6a. A function, $f_1$ 102, provides a mapping from parameter space to region space. The representation 104 of the horizon in region space is shown in FIG. 6b. Similarly, a second horizon 106 is represented in parameter space as shown in FIG. 6c. A function, $f_2$ 108, provides a mapping from parameter space to region space. The representation 110 of the horizon in region space is shown in FIG. 6d. The subdivision of the region by the first horizon 104 and the second horizon 110 forms three sub-regions 112, 114, 116, as shown in FIG. 6e. Region 112 is the subregion below horizon 110. Region 114 is the region between the two horizons, and region 116 is the region above horizon 104. A material property, MP, is assigned a value represented by the function MP, 118 in region 112. The material property is assigned a different function, $MP_2$ 120, in region 114. A representation of the value of MP 122 in region 112 is shown in FIG. 6f. A representation of material property MP 124 in region 114 is shown in FIG. 6g.

The process of simulation input model generation consists of an interactive phase in which the user specifies the size, location, and properties of a mesh or grid to be stored in a simulation input model description. The interactive phase is followed by an automated phase in which the simulation input model is built given the geoscience model and simulation input model description.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices, in known fashion.

Each program is preferably implemented in a high level procedural or object oriented programming language (such as C++ or C) to communicate with a computer system. However, the programs can be implemented in assembly or machine language, if desired. In any case, the language may be a compiled or an interpreted language.

Each such computer program is preferably stored on a storage media or device (e.g., ROM or magnetic/optical disk or diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Other embodiments are within the scope of the following claims.

What is claimed is:

1. A method for modeling geological data sampled from a subsurface region, the geological data and an analysis of the geological data being stored in a geoscience model on a magnetic media, comprising dividing the region into a first sub-region and a second sub-region by constructing a boundary between the sub-regions and wherein within each sub-region a material property varies without discontinuities;

storing on the magnetic media the shape of the boundary as a plurality of parametric functions whose parameter density can vary.

2. The method of claim 1 further comprising describing the variation of the material property within a sub-region with a parametric function.

3. A computer system for modeling geological data sampled from a subsurface region, the geological data and an analysis of the geological data being stored in a geoscience model on a computer-readable magnetic media, comprising means for dividing the region into a first sub-region and a second sub-region by constructing a boundary between the sub-regions and wherein within each sub-region a material property varies without discontinuities;

means for storing on the magnetic media the shape of the boundary as a plurality of parametric functions whose parameter density can vary.

4. The computer system of claim 3 further comprising means for describing the variation of the material property within a sub-region with a parametric function.

5. A computer-readable medium having computer readable instructions for modeling geological data sampled from a subsurface region, the geological data and an analysis of the geological data being stored in a geoscience model on a magnetic media, comprising instructions for causing a computer to divide the region into a first sub-region and a second sub-region by constructing a boundary between the sub-regions and wherein within each sub-region a material property varies without discontinuities;

store on the magnetic media the shape of the boundary as a plurality of parametric functions whose parameter density can vary.

6. The computer-readable medium of claim 5 further comprising instructions for causing a computer to model the variation of the material property within a sub-region with a parametric function.

* * * * *